United States Patent [19]

Block et al.

[11] Patent Number: 4,870,635

[45] Date of Patent: Sep. 26, 1989

[54] PRECISION MEASUREMENT AND POSITIONING SYSTEM FOR DISK STORAGE SYSTEM

[75] Inventors: Timothy R. Block, Rochester, Minn.; Mark R. Enstrom, Selah, Wash.; Francis S. Luecke, Byron, Minn.; Karl A. Shidler; Ronald L. Soderstrom, both of Rochester,, Minn.

[73] Assignee: International Business Machines Corporation, Armonk, N.Y.

[21] Appl. No.: 909,142

[22] Filed: Sep. 19, 1986

[51] Int. Cl.[4] .................. G11B 7/00; G11B 25/04; G11B 21/02

[52] U.S. Cl. .................... 369/215; 356/358; 360/78.11; 360/78.12

[58] Field of Search ............... 369/215; 360/78, 78.11, 360/78.12; 356/358

[56] References Cited

U.S. PATENT DOCUMENTS

| | | |
|---|---|---|
| 4,371,902 | 2/1983 | Baxter et al. ............... 360/77 |
| 4,377,036 | 3/1983 | Dangschat ............... 356/358 |
| 4,452,533 | 6/1984 | Miles et al. ............... 356/352 |
| 4,481,613 | 11/1984 | Yokota ............... 360/78 |
| 4,495,608 | 1/1985 | Kimura et al. ............... 369/215 |
| 4,498,775 | 2/1985 | White ............... 356/358 |
| 4,509,858 | 4/1985 | Smythe et al. ............... 356/358 |
| 4,531,167 | 7/1985 | Berger ............... 360/78 |
| 4,706,234 | 11/1987 | Okada ............... 369/215 |

FOREIGN PATENT DOCUMENTS

52435  3/1984  Japan ............... 369/215

Primary Examiner—Steven L. Stephan
Attorney, Agent, or Firm—Robert W. Lahtinen

[57] ABSTRACT

The invention uses a small sized, low cost, high accuracy, semiconductor laser interferometer to position the transducer in a disc storage system. Light is reflected back over the path to be measured and directly back into the semiconductor laser. This causes the power present in the laser to be varied. Unexpectedly, the output of the photosensor associated with the laser has an asymmetric, sawtooth waveform.

20 Claims, 9 Drawing Sheets

PRECISION MEASUREMENT AND POSITIONING SYSTEM FOR DISK STORAGE SYSTEM

BACKGROUND OF THE INVENTION

1. Field of the Invention

The present invention relates to precision measurement systems using optical interferometric techniques and particularly to the use of such techniques to for the purpose of positioning a transducer over the desired track in a disk storage device.

2. Description of the Prior Art

Optical interferometry measurement systems have found widespread application in the laboratory and other situations where the precision required is greater than can be accomplished with other techniques, especially mechanical measurement techniques. The use of interferometry is particularly attractive where the distance to be measured is relatively short, the required precision is compatible wit the wavelength of the source, and the rest of the system is sufficiently expensive to prevent the measurement portion from becoming an undue proportion of the cost. The availability of monochromatic sources such as lasers has made optical measurement a much more practical technique and expanded the applications into surveying, machine tool control, robotics, and similar fields. The development of semiconductor lasers further expanded the field of application by reducing the size, complexity and cost associated with the radiation source. Although there has been a great improvement in the source itself, for example, the use of small, low cost semiconductor lasers the basic interferometer structure has remain unchanged. This structure is necessarily complex and must be made and aligned with great care to obtain the full accuracy possible with such systems. The attendant cost and size have remained as deterrents to those applications where these are primary considerations. Small machine tools, industrial robots, computer disk files and printers are example of applications which have not been fully exploited because of the size and cost of optical measurement systems.

Semiconductor lasers provide a solution to the size and cost problems associated with other lasers, but they introduce a new set of problems which has inhibited their use. For example, the output from semiconductor lasers is highly temperature dependent. Since most applications require a constant power output from the source, some form of power regulation is required. This leads to some type of power measurement and control system. Because this is virtually a universal requirement, most semiconductor lasers include a photosensor, such as a light sensing diode, to sense the power output of the device, positioned on the reverse face of the device. This diode provides an output signal which approximates the power output from the device. This approach, while not as accurate as actually sampling the output beam, has been widely accepted because of the simplicity it provides. Where extreme accuracy is required, the light sensing diode may be positioned to sense the beam emerging from the output face of the laser.

One of the sources of error with the use of diodes mounted on the laser is the power which is fed back into the laser by reflection. To avoid this error, even simple interferometric systems incorporate some form of beam splitter or other optical component to reduce the intensity of the return beam impinging on the laser. This of course increases the cost, not only by the value of the component and supporting structure, but also by the increased difficulty of manufacturing as a result of the additional alignment required.

In addition to sensitivity to reflected power, semiconductor lasers also suffer from a shift in wavelength as the output power is varied. Any change in wavelength also changes the fringe pattern and therefore the output signal of an interferometer even though the path length stays the same. To avoid this problem, designs have relied on some means for stabilizing output power at the desired level and preventing reflected light from reentering the laser.

The cost of gas and semiconductor laser measurement systems has inhibited the expansion of their use into additional fields. For example, in the data processing industry their application has been generally limited to high precision plotting devices and testing systems. While the positioning requirements for disk storage devices could be satisfied with semiconductor laser interferometers, the other optical elements and associated electronic circuits have been much too expensive and take up too much space. As a result, most head positioning servo systems have continued to rely on reference (servo) information recorded on the disk at the time of manufacture. This approach is satisfactory but typically requires the dedication of recording space that could otherwise be used for data. It also complicates the manufacturing process since the servo information must be recorded on the disk after mounting on the spindle.

In the case of lower performance disk files which use flexible disks or diskettes, the trend has been to employ an open loop transducer positioning system using stepper motors. Flexible disk files have generally used a mechanical coupling such as a metal band between the stepper motor and the recording head so that the position of the stepping motor corresponds to the position of the head. The lack of precision in such as system prevents utilization of the full recording potential of the file. The track-to-track spacing required from the magnetic recording standpoint alone is narrower than can be obtained with stepper motor technology. Track density could therefore be increased if the transducer could be positioned more accurately.

The cost and size constraints have also prevented widespread application of interferometric techniques to other disk storage devices. In the case of high performance files, the measurement system must be placed in a sealed enclosure which cannot be opened except in a tightly controlled environment, making service and alignment difficult. Flexible disk files are so inexpensive that they cannot carry the cost burden imposed by such measurement systems. In all situations, the lack of space within the drive assembly is a serious impediment to the incorporation of optical measurement systems.

SUMMARY OF THE INVENTION

It is an object of the invention to provide a small size, low cost, high accuracy, semiconductor laser interferometric system suitable for use in positioning the data transducer in a disk file storage system.

In this system, contrary to common practice, the light reflected back over the path to be measured is fed directly into the semiconductor laser. As is commonly known, the introduction of reflected power through the front, or emitting, facet of the laser actually alters the power present in the laser with an attendant effect on the signal from the photosensor usually located on the rear facet of the laser. Wholly unexpectedly, the output signal from the photosensor associated with the laser has an asymmetric sawtooth (triangular) waveform. This is in constrast to the output signal from a conventional interferometer which has a sinusoidal waveform.

The photosensor output signal is profoundly affected by the return beam. Also unexpectedly, the sawtooth output signal from the photosensor is an essentially linear signal over the range between adjacent fringes. That is, except for the transition at positive and negative peaks, as the path length of the reflected beam is increased or decreased the sawtooth output signal changes in a direct liner relationship to the change in path length. This allows precise measurement of changes in distance less than the distance between adjacent fringes.

The asymmetric characteristic of the sawtooth output signal makes it possible to determine the direction of movement, something which cannot be done with the symmetrical sinusoidal output of a conventional interferometer. In addition, the linearity of the sawtooth waveform greatly simplifies the problem of interpolation between peaks.

The foregoing and other objects, features, and advantages of the invention will be apparent from the following more particular description of the preferred embodiments of the invention, as illustrated in the accompanying drawings.

DETAILED DESCRIPTION

Figure 1:
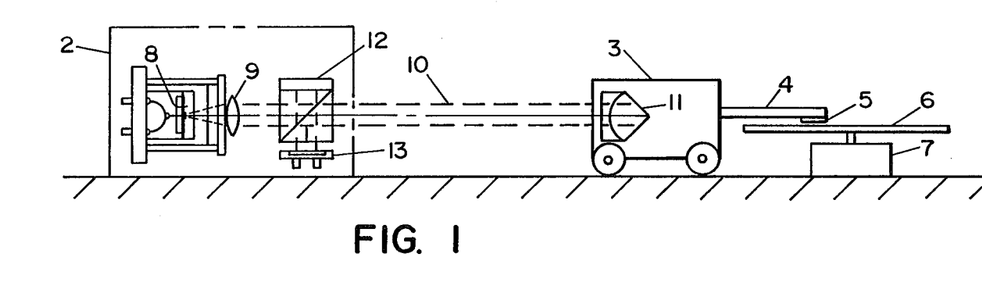
FIG. 1 is a schematic portrayal of a prior art interferometer for measuring the position of a disk drive carriage used to support and position a transducer over a disk.

FIG. 1 shows a conventional interferometer 2 used to measure the position of a carriage 3 having a transducer support arm 4 supporting a transducer 5, positioned at the end of arm 4 for coaction with the recording disk 6 which is driven by motor 7. The interferometer 2 incldes a semiconductor laser 8 which emits a beam of radiation which is collimated by lens 9 and directed along path 10 to the retroreflector 11 mounted on carriage 3. The beam passes through a beam splitter 12, along path 10 to impinge on retroreflector 11 and return to beam splitter 12, where it is diverted to photosensor 13.

Movement of carriage 3 allows the transducer 5 to coact with selected tracks recorded on the surface of disk 6. As the carriage is moved to effect the access of a desired track, the path length between laser 8 and retroreflector 11 changes, causing the output of photosensor 13 to vary in a sinusoidal manner as interference fringes are created.

Figure 2:
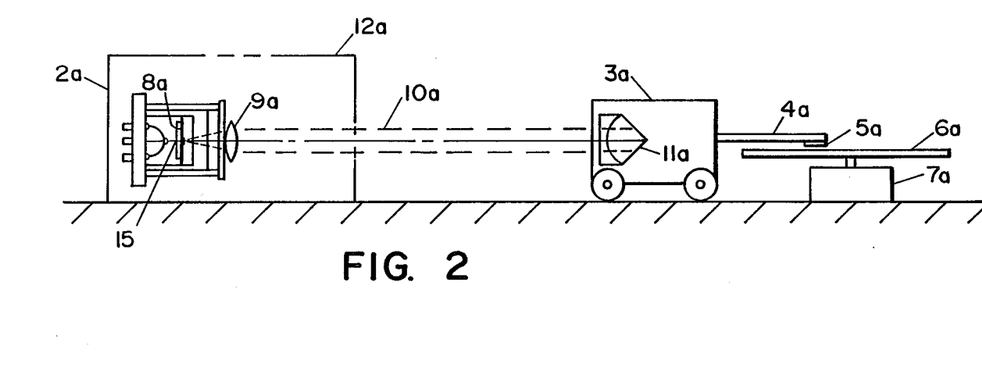
FIG. 2 is a schematic portrayal of the interferometer of this invention for measuring the position of a disk drive carriage used to support and position a transducer over a disk.

The interferometer of FIG. 2 corresponds to the invention. Those components which have a counterpart in the embodiment of FIG. 1 are identified with the suffix "a" and, except for laser 8a, perform in the same fashion as their counterpart in FIG. 1. It can be seen that the beam splitting prism 12 and photosensor 13 are not contained in the embodiment of FIG. 2. However, a photosensor 15, positioned on the rear facet of semiconductor laser 8a, provides an output signal which is affected by the interference between the emerging beam and the return beam to produce a signal which, like the photosensor 13 of FIG. 1, varies in accordance with changes in path length between the laser 8a and retroreflector 11a.

The carriage 3 and its counterpart 3a are moved with an appropriate actuator, not shown. In the usual case the actuator will be a voice coil motor, a rotary counterpat of other electromagnetic driver.

Figure 3:
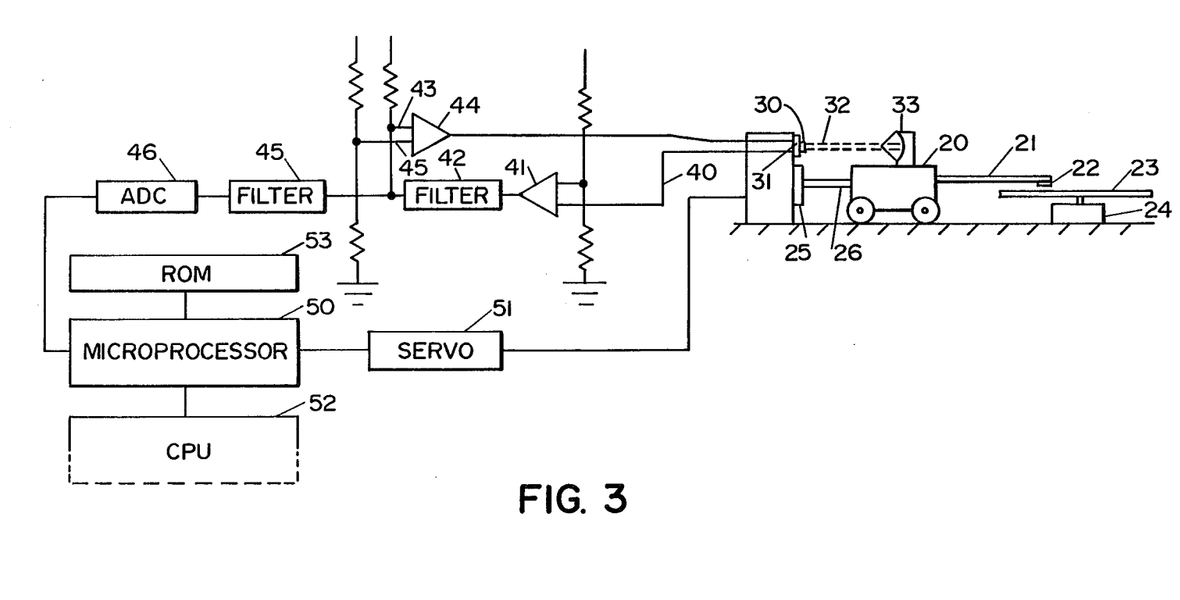
FIG. 3 is a schematic drawing of one embodiment of the system in which a microprocessor is used to count fringes.

FIG. 3 is a complete system diagram for a disk file positioning system according to the invention. A carriage 20 has a transducer support arm 21 which supports transducer 22, positioned at the end of support arm 21 for coaction with disk 23 driven by motor 24. The carriage 20 is driven by actuator 25 coupled to carriage 20 by a drive rod 26. A semiconductor laser 30 and associated photosensor 31 are arranged in a fashion similar to that of FIG. 2, so that the beam of radiation from laser 30 travels along path 32 to impinge upon retroreflector 33. The reflected beam travels back along path 32 to strike laser 30. The interference causes the output of the photosensor 31 to vary, providing a signal responsive to changes in the length of path 32.

The output signal from photosensor 31 on line 40 is applied to one input of differential amplifier 41. The amplified signal is conditioned by filter 42 to remove unwanted components and applied to input 43 of differential amplifier 44, the output of which is used to control the current input to laser 30. The unwanted component may include high frequency oscillations due to the change in frequency of the laser 30 caused by variations in power output and temperature. The sense of the amplifiers is such that increases in the power sensed by photosensor 31 cause the value of current to laser 30 to decrease, thereby tending to stabilize the output around a preset value determined largely by the reference voltage established at input 45 of amplifier 44.

Despite the regulation of the current to the laser, there may be variation in the output of photosensor 31 which are not fully removed by filter 42. The output of photosensor 31 is further conditioned by filter 45 to reduce unwanted components and noise before conversion to digital form in analog to digital converter 46.

The digitized signals are read by microprocessor 50 and converted into signals to the servo 51 which in turn causes carriage 20 to be moved in accordance with disk track address specified by the computer central processing unit (CPU) 52. The microprocessor 50 operates in accordance with data and instructions stored in a read only memory (ROM) 53 to calculate the number of fringes which must be moved in order to properly position the transducer 22 over the desired track. Once the number of fringes and direction of movement is determined, the output signal to servo 51 causes the carriage 20 to begin motion in the appropriate direction. As the carriage 20 moves, the changes in length of path 32 cause the creation of fringes and corresponding output signals from photosensor 31. The digitized signals from photosensor 31 are analyzed by microprocessor 50. When the appropriate distance has been moved, as evidenced by the requisite number of fringes, microprocessor 50 sends a "Seek Complete" signal to the CPU and terminates the signal to servo 51 and carriage 20 remains positioned over the desired track.

It will be appreciated that deviations from the position over the desired track will cause movement of carriage 20 and develop signals from the photosensor 31. Microprocessor 50 then sends correction signals to servo 51 to restore transducer 22 to the proper position. Alternatively, the correct position can be maintained by a track following servo or a mechanical lock on carriage 20, in response to a seek complete or similar appropriate signal generated by microprocessor 50 when the desired track is reached.

Figure 12:
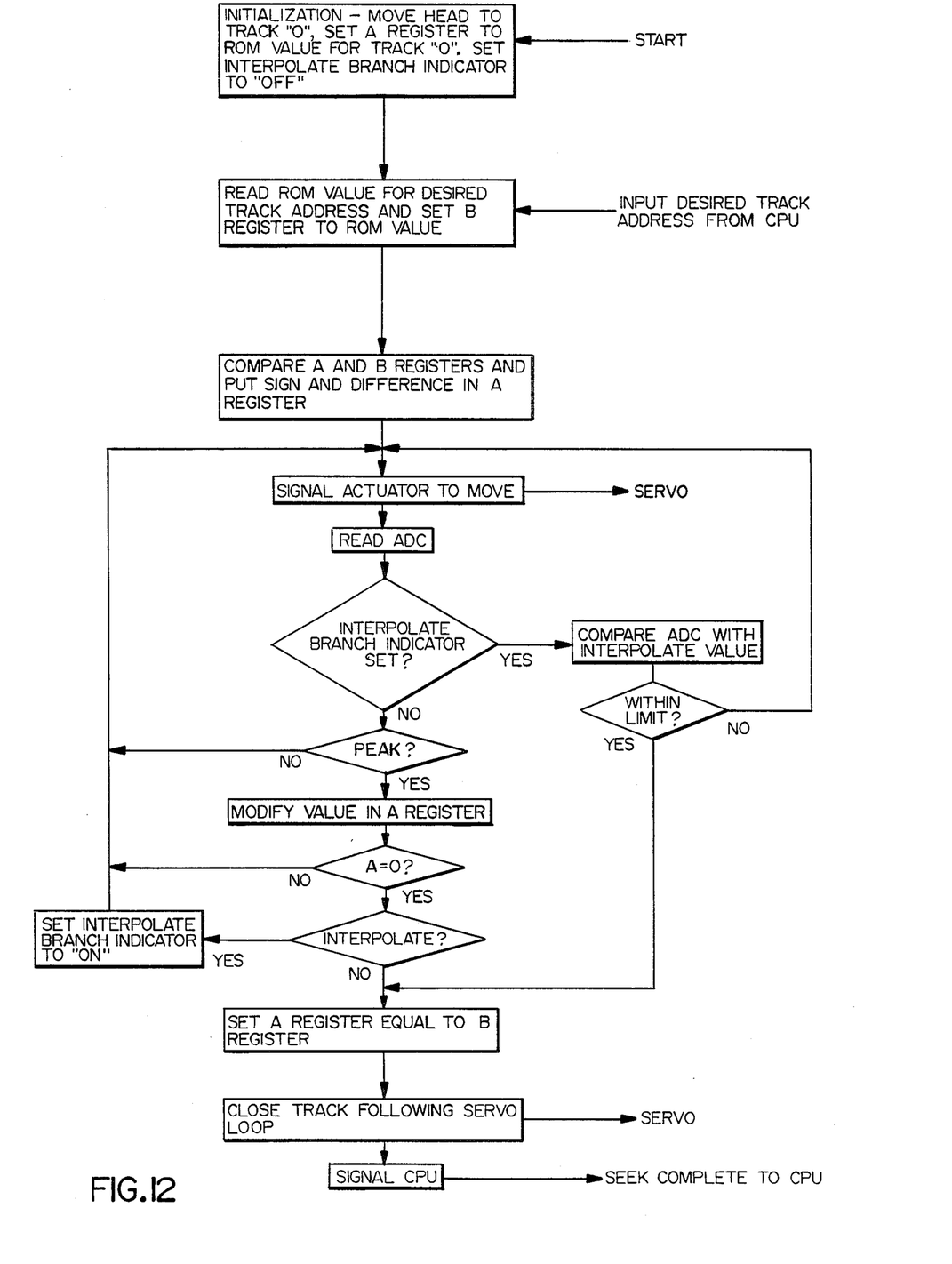
FIG. 12 is a data flow diagram showing the microprocessor program used in the embodiment of FIG. 3.

The program used by microprocessor 50 is shown in the data flow diagram of FIG. 12. At the beginning of operation, the application of power to the system causes the CPU 52 to send a start pulse to microprocessor 50. This pulse causes initialization of the microprocessor and associated components. A signal is developed by the microprocessor which causes the servo 51 to drive the carriage to a mechanical or other reference point, for example track 0. The basic registers in the microprocessor, the A register which is used to store the current track address, and the B register which is used to store the desired track address, are set to zero.

While these registers are specified as containing track address, they in fact contain track addresses which have been translated to be expressed in fringes. This is accomplished by performing a simple translate function constituting looking up the fringe data stored at a ROM location which is accessed by use of the track address.

The initialization operation includes setting the interpolate branch indicator to the off condition. As mentioned earlier, it is possible to measure and position to a point which is intermediate to the fringe peaks. This is easily accomplished since the waveform is essentially triangular. A track address or other desired position which does not lie exactly on a fringe peak can be specified as a number of fringes, an indication that interpolation is required and an interpolate value which corresponds to a particular value from the ADC. For example, if the desired point is midway between two fringes, the address stored in ROM corresponding to this track would be a composite value. The first part would be the number of fringes corresponding to the distance from a reference such as track 0. The second part would be the ADC value corresponding to the additional increment.

When the CPU wishes to access data stored on a particular track, a value indicating the desired track address is sent to the microprocessor 50. The microprocessor translates this to fringes and an interpolate value, if appropriate, and stores it in the B register. The value in the A register, which is the current track address, is then compared with the value in the B register, and the sign and difference are stored in the B register. The microprocessor then commands the actuator to move by sending the appropriate signal to the servo 51.

The microprocessor 50 then reads the ADC to obtain the current position of the carriage 20. Subsequent to reading the ADC, a test of the interpolate branch indicator is made. Since this was set to "Off" in the initialization procedure, the next step is the analysis of the ADC readings to determine whether a peak value has been reached. This is accomplished with conventional mathematical techniques. One such technique is to compare a series of readings to see if the difference between successive readings has changed sign.

Normally a series of readings of the ADC will be required before a peak is detected. This involves looping through the series of instructions beginning with the signal to the actuator to move and ending with the determination that a peak has not been reached. The failure to detect a peak leads the system to loop back to the point where the actuator is signalled to move.

When a peak is detected, the value in the A register is decremented by one and the resulting value tested to see if it is zero. Assuming that the desired position has not yet reached and therefore the value is still not zero, the program loops back and again the actuator is signalled to move. This action continues until the carriage 20 has moved the desired distance and the requisite number of fringes have been counted to drive the value in the A register to zero.

When the test of the value in the A register shows that the requisite number of fringes (peaks) have been counted and the value has therefore reached zero, the program checks to see if interpolation will be required. This is ascertained by examining the address which was extracted from the ROM and placed in a special portion of the A register reserved for this purpose to determine if the portion which contains the interpolate value is zero. If it is not zero, interpolation is required.

The program sets the Interpolate Branch Indicator to "On" and loops back to the point where the actuator is signalled to move. The ADC is then read again. Since the Interpolate Branch Indicator has now been set to "On", the system branches to the portion of the program which compares the value read from the ADC with the interpolate value obtained from the ROM and stored in the special portion of the A register. Assuming that the value read from the ADC is not sufficiently close to the desired value, the system again loops back to the point where the actuator is signalled to move. This continues until the ADC value is close to the interpolate value in the register. The limit specified for this test (tolerance) will be a function of the rate at which the ADC is read, the precision of the ADC and the accuracy required of the system.

When the value read from the ADC is sufficiently close to the interpolate value in the A register, the comparison will indicate that it is within the specified limit and the system branches to the portion of the program which sets the A register equal to value in the B register. Thus, the B register contains the current location of the carriage specified in terms of fringes and an interpolate value. At this point the track access is complete and a signal may be sent to the track following servo. The CPU is then signalled that the access is complete and that data may be transferred.

The track servo can be the type which uses servo information recorded on the disk or it can be implemented by additional instructions in the program used by microprocessor 50.

Such instructions would involve a loop much the same as the portion of the program just described which operates to move the carriage the distance from the last fringe to the position specified by the interpolte value. In essence, such a program would read the ADC and test the reading against the interpolate value. If the difference between the two exceeds the specified limit, the program would cause a signal to be sent to the actuator causing it to move in the direction opposite to the difference. The program would loop until the actuator has moved the carriage to the point where the difference between the ADC value and the interpolate value is again within acceptable limits.

It will be appreciated that in a specific system, the detailed algorithm employed by the microprocessor for interpreting position would take system stability requirements into consideration so that mechanical oscillations do not occur as a result of inadequate phase or gain margin.

Figure 4:
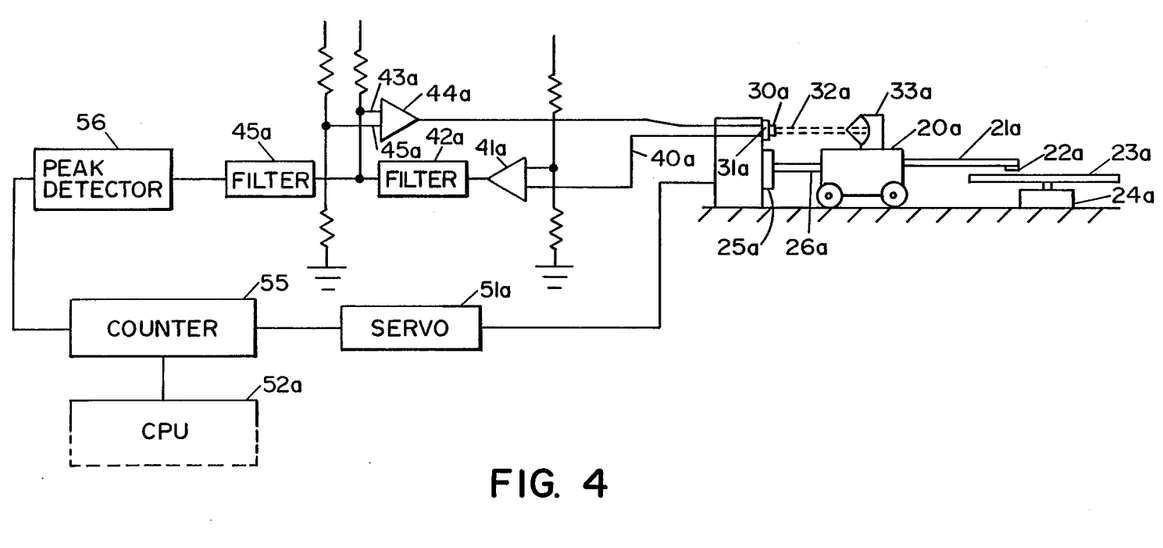
FIG. 4 is a schematic drawing of another embodiment of the system in which a counter is used to count fringes.

In the embodiment of FIG. 4, like components to FIG. 3 bear the suffix "a". In this embodiment, microprocessor 50 and ROM 52 are replaced by counter and the ADC 46 has been replaced with a peak detector 56. The other components stay essentially the same except that the characteristics of filters 42a and 45a may be altered to provide the response desired for the different system.

This system operates in somewhat different fashion. The CPU 52a sends a signal to counter 55 which represents the distance in terms of the number of fringes and direction to be moved. Counter 55 generates a signal to servo 51a which causes carriage 20a to begin movement in the desired direction. This movement generates output signals from photosensor 31a which are filtered and applied to peak detector 56. Each fringe develops a single output signal from peak detector 56. The output signal is applied to the input of counter 55 causing it to count down by one increment. When the counter reaches zero, an output signal is developed to servo 51a which causes a motion of carriage 20a to cease. As in the case with the previous embodiment, the carriage can be mechanically held in position, or a separate servo system can be used to maintain the transducer 22a over the desired track on disk 23a.

The separate servo system can utilize servo information recorded on the disk or can operate in response to fringe information. If it is desired to operate under the control of fringe information, the counter 55 need only be adapted to count bidirectionally. When outside influences such as mechanical vibration causes the carriage to move, the resulting fringes produce an output from the peak detector 56. Depending on the direction of the movement, the output of the peak detector is applied to a count up or count down input to counter 55. A non-zero value in counter 55 causes the servo 51a to move the carriage 20a in a direction which restores the counter to zero.

Since the triangular waveform from the photosensor is non-symmetrical, it is possible to determine the direction of movement by analyzing the location of the peak relative to the zero-crossing point. If the peak is closer to the zero-crossing on the steep side of the waveform, movement is in a first direction. On the other hand, if the peak is closer to the zero-crossing on the less steep side of the waveform, then movement is in the other direction.

Figure 5:
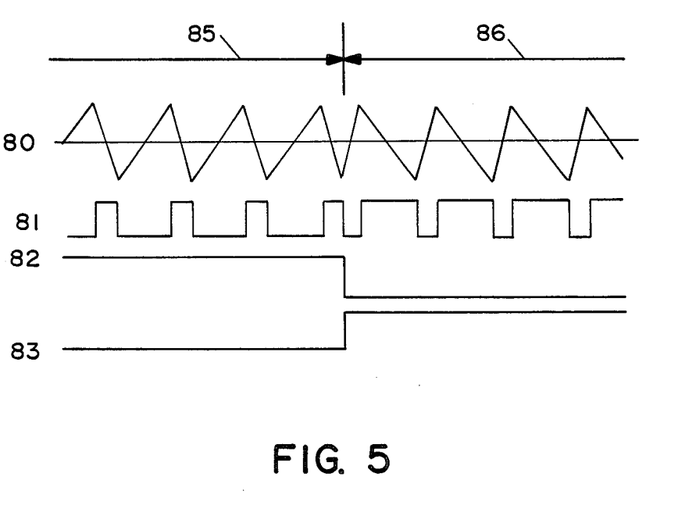
FIG. 5 is a diagram of the circuit used to determine the direction of movement of the actuator carriage.

A satisfactory circuit for this analysis would be one which generated a high output when the positive peak is reached and terminated the high output when the next succeeding negative peak is reached. A suitable circuit for this purpose is shown in FIG. 5. The circuit shown in FIG. 5 would replace the peak detector 56 and counter 55 of FIG. 4. Like elements in FIG. 5 are indicated with the suffix "b".

The output from filter 45b, as shown as the asymmetrical triangular waveform 80, is applied to peak detector 60 which develops three output signals on lines 62, 63 and 64. The output signal on line 62 represents the output signal developed in FIGS. 3 and 4, corresponding to the peak to be counted. The output signal on line 63 is the positive peak and the output signal on line 64 is the negative peak.

The positive and negative peak signals are applied to the set and reset inputs of flip-flop 65 to develop the output signal as shown in waveform 81. The asymmetrical waveform 81 from the output of flip-flop 65 is applied to the symmetry detector 66 which has count up and count down output signals corresponding to waveforms 82 and 83 respectively. The count up and count down signals are applied to counter 67 to control the direction of the count.

Arrow 85 indicates the direction of movement of carriage 20a which produes left portion of the waveform 80. Arrow 86 indicates the direction of motion of carriage 20a which produces the right portion of waveform 80. The difference is symmetry is obvious. The square wave 81 reproduces this difference, which is detected in the symmetry detector 66 to produce the counter control signals of waveforms 82 and 83.

The asymmetrical waveform will be produced whenever the carriage 20a moves. Thus, if external forces should cause the positioned carriage 20a to move from the desired location, the resulting pulses on line 62 will be applied to counter 67, causing it to deviate from a zero value and generate a signal to the servo 51b signalling the direction of movement to restore the carriage to the proper position. The direction of movement will be determined by the sense of the count in counter 67. A positive value will cause movement in one direction and a negative value will lead to movement in the opposite direction.

Figure 6:
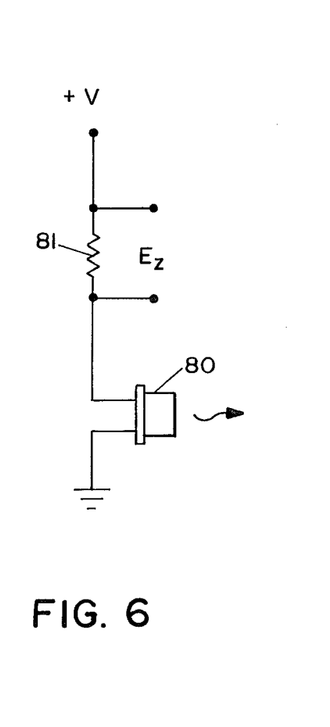
FIG. 6 is a circuit drawing for a laser power supply in which the output signal represents the impedance of the laser.

The fringe signal is advantageously developed from a photosensor associated with the laser since most lasers of the type used in this application come equipped with the photosensor. However, there are other ways of developing the fringe signal. For example, the changes induced in the laser due to the reflected signal have an affect on the impedance of the laser. FIG. 6 shows a circuit that can be used to develop a signal which responds to changes in impedance. The laser 80 is driven from a constant voltage source +V through a resistor 81. The signal voltage Ez across the resistor 81 is responsive to changes in impedance.

Figure 7:
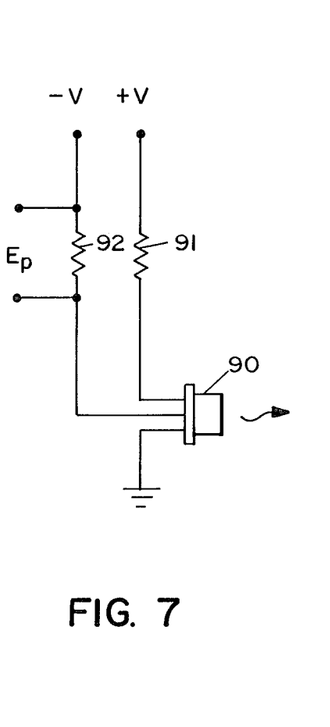
FIG. 7 is a circuit drawing for a laser power supply in which the output signal represents the power in the laser cavity.

The circuit of FIG. 7 uses a photosensor responsive to changes in the radiant power within the laser 90. Drive current to laser 90 is fed from a constant voltage source +V through resistor 91. The photosensor associated with the rear facet of laser 90 is a photodiode energized from a power supply −V through resistor 92. The voltage Ep across resistor 92 is representative of the radiant power within the laser 90.

Figure 8:
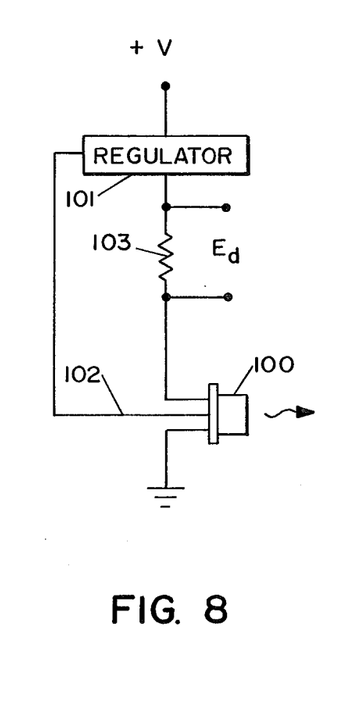
FIG. 8 is a circuit drawing for a laser power supply in which the cavity power is regulated and the output signal represents the power input to the laser.

FIG. 8 illustrates another approach to the detection of fringes. In this circuit, laser 100 is energized from a power supply +V through a regulator 101 which is controlled by the output signal on line 102 from the photosensor associated with the laser cavity. The output of the laser is therefore controlled to provide an essentially constant output. Changes in the characteristics of the laser due to reflected power and other factors will cause changes in the drive current required to produce the desired power output level. The drive current will produce a voltage Ed across resistor 103.

Figure 9:
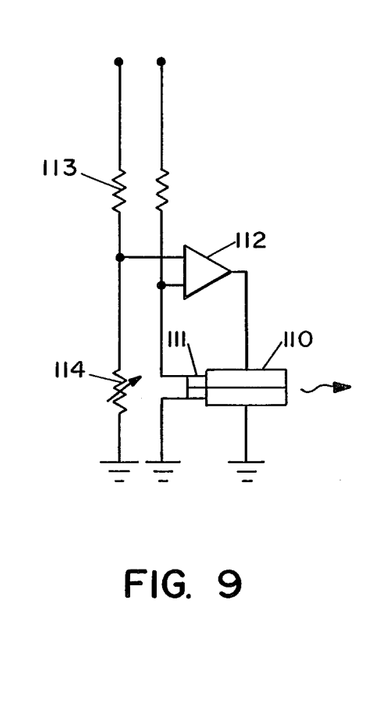
FIG. 9 is a circuit drawing for a laser power supply in which the laser cavity power may be regulated at varied levels.

FIG. 9 is a schematic showing of the relationship of the semiconductor laser 110 and the associated photosensor 111. The laser 110 emits light as shown by the arrow. The photosensor 111 is mounted on the rear facet of laser 110. The output signal of the photosensor 111 is applied to an input of the differential amplifier 112, which compares the signal to a reference voltage developed at the junction of resistors 113 and 114. The reference voltage is adjusted by means of variable resistor 114 to produce a drive current to laser 110 which provides the desired laser output.

Figure 10:
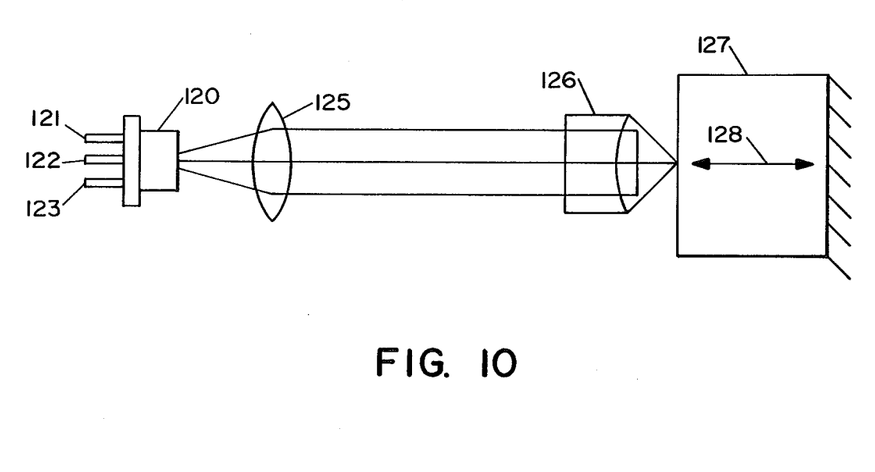
FIG. 10 is a schematic portrayal of a portion of the test arrangement used to generate the waveforms of FIG. 11.
Figure 11:
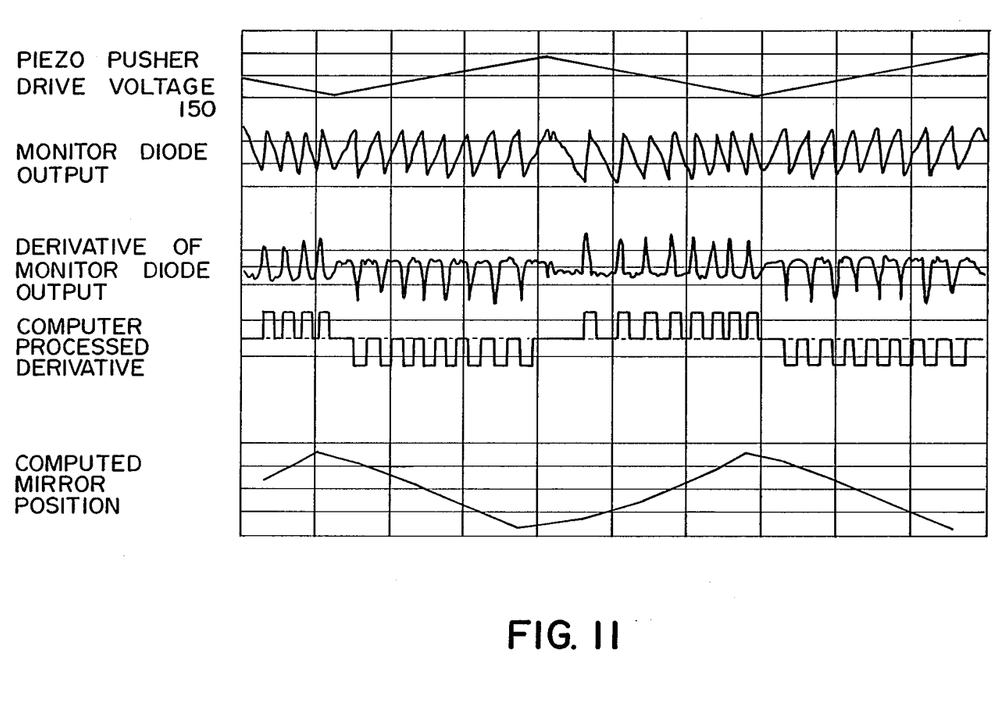
FIG. 11 is a composite set of waveforms obtained at various points in the test arrangement of FIG. 10.

FIG. 10 is a schematic drawing of the system used to derive the signals shown in FIG. 11. A semiconductor laser 120 has a drive terminal 121, a photosensor output terminal 122 and a ground terminal 123. The output beam of laser 120 is collimated by lens 125 and directed to the retroreflector 126. The retroreflector 126 is fastened to a piezoelectric driver 127 which, when energized by a sawtooth waveform, causes the retroreflector to oscillate back and forth in the direction indicated by arrow 128. The resulting movement of retroreflector 126 causes changes in the length of path 130 followed by beam emitted by laser 120 and reflected back into it.

The effect of the reflected beam on the lasing action is complex and may vary with different conditions of path length and laser drive power. In the system shown in FIG. 10 is analyzed as closely coupled internal and external cavities and the length of the external cavity is an order of magnitude greater than the internal cavity, the longitudinal mode structure of the external cavity will have many more modes per unit frequency than the mode structure of the laser diode cavity. The system of the two cavities will resonate with a combination of one laser cavity mode and one external cavity mode. If perturbed, the system would be expected to "hop" between laser cavity modes and/or external cavity modes.

The existence of a sawtooth output signal from the photosensor may be due to the asymmetric gain suppression of non-lasing diode cavity modes. Since such non-lasing diode cavity modes are suppressed asymmetrically it is reasonable to assume that the adjacent non-lasing (or non-active) external cavity modes are also suppressed asymmetrically.

If there were no asymmetry in the gain suppression profile, a gradual transition from one external cavity mode to the next would be expected. Theoretical curves calculated by Acket, et al "The influences of Feedback Intensity on Longitudinal Mode Properties and Optical Noise In Index Guided Semiconductor Lasers", IEEE Journal of Quantum Electronics, p. 1163–1169, Vol. QE-20, No. 10, October 1984, show that the asymmetry in the gain suppression, and therefore the amount of hysteresis present in mode hopping, is a strong function of output power of, and the feedback to, the laser.

Biesterbos et al, "Low Frequency Mode-Hopping Optical Noise in AlGaAs Channeled Substrate Lasers Induced by Optical Feedback, IEEE Journal of Quantum Electronics, p. 986–990, Vol. QE-19, No. 6, June 1984, describes experimets on mode-hopping noise which suggest that the excess noise associated with mode hopping strongly depends on the occurrence of hysteresis associated with the mode hopping transition and that gain suppression near the lasing mode is asymmetric. Diode cavity mode hopping in the presence of hysteresis and asymmetric gain suppression.

Other references which may contribute to an understanding of this invention include a paper by Goncharov, et al, "Influence of an External Mirror on the Characteristics of Semiconductor Laser Radiation", Soviet Journal Quantum Electronics, Vol 15(2), February, 1985, p. 259–262, which reports the results of an investigation made of the characteristics of the radiation emitted by injection lasers with an external mirror and different levels of optical coupling.

A publication by Lang, et al "External Optical Feedback Effects on Semiconductor Injection Laser Properties", IEEE Journal of Quantum Electronics, Vol. QE-16, No. 3, March 1980, p. 347–355, discusses the effect of external feedback on the dynamic properties of injection lasers.

Kume et al, in "Noise Reduction in Single Longitudinal Mode Lasers by High-Reflectivity Coatings", IEEE Journal of Quantum Electronics, Vol. QE-21, No. 6, June 1985, p. 707–711, describes the reduction of feedback-induced noise in single longitudinal mode semiconductor lasers by the use of high-reflectivity facet coatings.

The effect of an external cavity which is shorter than the laser cavity and tightly coupled to it is discussed by Miles et al, in "An External Cavity Diode Laser Sensor", Journal of Lightwave Technology, Vol. LT-1, No. 1, March 1983, p 81–91.

A general discussion of self-stabilization of longitudinal modes in semiconductor lasers is presented by Kazarinov et al in, "Longitudinal Mode Self-Stabilization in Semiconductor Lasers", Journal of Applied Physics, Vol. 53, No. 7, July 1962, p. 4631–4644.

Returning to the system of FIG. 10 and the waveforms of FIG. 11, the application of a drive signal having the waveform shown as "Piezo Pusher Drive Voltage" will cause the retroreflector 126 to oscillate as described. The resulting interference fringes are detected by the photosensor and produce an output signal at terminal 122 as shown by the waveform "Monitor Diode Output". The asymmetry and sawtooth characteristics are easily recognized.

Computer processing of the Monitor Diode Output signal produces the derivative waveform identified as "Derivative of Monitor Diode Output" in FIG. 11. Further processing leads to the "Computer Processed Derivative" signal which is a square wave having a polarity indicative of the direction of movement of the retroreflector. Final processing of the signal leads to the waveform "Computed Mirror Position" representing the position of the retroreflector.

These waveforms can be produced by the microprocessor 50 of FIG. 3 and used to control the position of carriage 20 through servo 51.

Figures 13, 15:
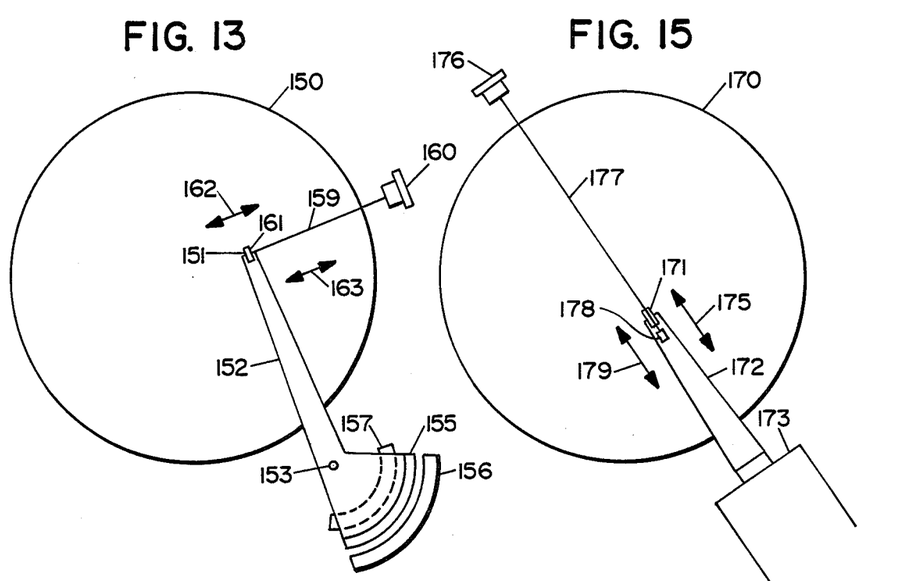
FIG. 13 is a plan view of a disk and rotary actuator using the interferometer of the invention wherein the path length is measured close to the transducer.
FIG. 15 is a plan view of a disk and linear actuator using the interferometer of the invention wherein the path length is measured at a point close to the transducer.

FIG. 13 illustrates the fashion in which the interferometer of this invention is coupled to a disk drive system having a radial (swing arm) actuator. The disk 150 contains a plurality of data tracks which are sensed or written by transducer 151 supported on actuator arm 152. Actuator arm 152 is mounted for rotation about an axis 153. The rotation to position transducer 151 over the desired track is accomplished by energizing drive coil 155 which is mounted in the air gap between permanent magnets 156 and 157. A retroreflector 161, which may be a corner cube arrangement of a mirror, a reflective corner cube portion of support arm 152 or a retroreflective material made up of small glass beads, is positioned on the actuator arm near the transducer 151. The laser-photosensor 160 is mounted so that the emergent beam 159 strikes the retroreflector 161 and a portion of the beam is reflected back along path 159 into laser-photosensor 160.

In this configuration, the fringes are derived for a relatively long path length and a large change in path length. The movement of retroreflector 161 is represented by length and direction of arrow 162. The movement of transducer 151 is represented by arrow 163. It can be seen that the two arrows are identical. While such systems perform as desired, there are situations where it is desirable to reduce the total path length to ensure that beam coherence is not lost and reduce the change in path length to eliminate problems such as degredation in the sawtooth waveform.

Figure 14:
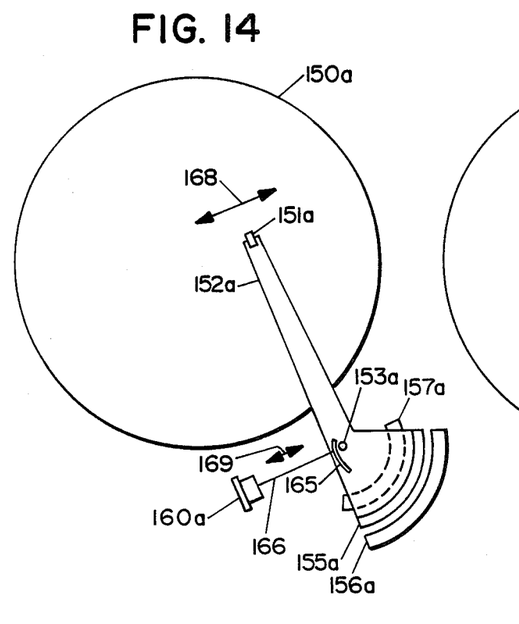
FIG. 14 is a plan view of a disk and rotary actuator using the interferometer of the invention wherein the path length is measured at a point close to the axis of rotation to reduce the apparent change in path length.

The embodiment of FIG. 14 provides a reduced path length and a reduction in the change in path length as the transducer is moved from the inner to the outer tracks. Like elements have been identified with the suffix "a". It can be seen that the laser-photosensor 160a has been moved to a position where the emergent beam along path 166 strikes a retroreflector 165. As the actuator assembly is rotated to position the transducer 151a over the desired track, the length of path 166 between the laser-photosensor 160a and the retroreflector 165 changes. The change in path length for a given number of degrees of rotation is substantially less than in the case of the arrangement of FIG. 13. The direction and magnitude of the movement of transducer 151a is represented by the arrow 168. The arrow 169 represents the direction and effective change in length of path 166 between laser-photosensor 160a and retroreflective surface 165. It can be seen that the overall length and change in distance is substantially less tha the path 159 of FIG. 13. This has beneficial results in terms of eliminating problems caused by loss of coherence and the degredation in waveform.

Figure 16:
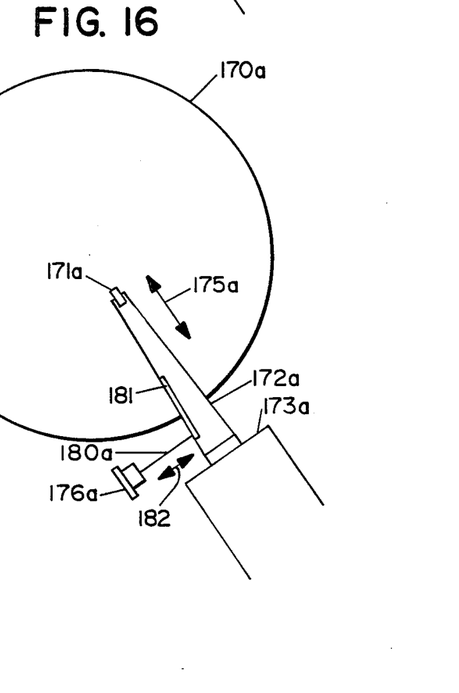
FIG. 16 is a plan view of a disk and linear actuator using the interferometer of the invention wherein the path length is measured from a cam-like portion of the transducer support arm to reduce the apparent change in path length.

Certain types of high performance disk storage systems utilize linear actuators which incorporate voice coil motors. The interferometer of this invention is well suited for use with such systems. In FIG. 15, a storage disk 170, having data arranged in circular tracks, is positioned beneath a transducer 171 mounted on actuator arm 172 which is coupled to the voice coil actuator 173. Drive current supplied to voice coil actuator 173 causes the actuator arm 172 to move along the path indicated by the arrow 175. The length of the arrow indicates the distance moved. A laser-photosensor 176 generates a beam which follows path 177 to strike the retroreflector 178 mounted on actuator arm 172 in close proximity to transdcer 171. Reflector 178 is positioned to return the beam to the laser-photosensor 176 and develop the fringes as earlier discussed. Arrow 179 represents the distance and direction of movement of retroreflector 178. It can be seen that this is essentially the same as the arrow 175 representing the distance and direction of movement of the transducer 171.

Where the relatively long movement of the transducer introduces problems associated with loss of coherence and degradation of waveform, the system of FIG. 16 may be used. In this configuration, laser-photosensor 176a is positioned to project the beam along path 180a and strike a retroreflective portion 181, which could be a retroreflector made of small glass beads, of actuator arm 172a. The reflected beam returns to the laser-photosensor 176a where the fringes are produced as earlier described. In effect, the reflective portion functions as a cam surface, gradually changing the length of path 180a as the actuator arm 172a and transducer 171a are moved across disk 170a. The effective length and direction of movement of reflective portion 181 is represented by arrow 182. It can be seen that the length of the movement is substantially shorter than the distance moved by transducer 171a. The reduced path length and change in path length are effective to reduce problems associated with the loss of coherence and degradation of waveform.

What is claimed is:

1. An interferometric device for measuring distance and direction of motion between said device and a target surface comprising a semiconductor laser including a laser cavity for generating coherent radiation;

means carried by said target surface to reflect radiation from said laser back to said laser cavity;

measurement means for generating an output pulse train signal representative of optical conditions in said laser cavity; and signal processing means connected to said measurement means for converting said output pulse train signal into distance measurements and the direction of relative motion between said device and said target, said signal processing means including means for sensing pulses with a greater slope leading edge, indicative of relative motion in one direction and pulses with a greater slope trailing edge, indicative of motion in the direction opposite said one direction.

2. A device according to 1 wherein said signal processing means includes digital means for counting in response to said output signal and producing said distance measurements.

3. A device according to claim 2 wherein said digital means counts in response to changes in said output signal.

4. A device according to claim 3 wherein digital means includes a programmed microprocessor.

5. A device according to claim 4 wherein said programmed microprocessor includes storage means having distance measurements stored at addresses corresponding to said output signals.

6. A device according to claim 4 wherein said programmed microprocessor processes said output signals to provide additional distance measurements intermediate said transitions.

7. A device according to claim 6 wherein said programmed microprocessor processes said output signals by interpolation to provide additional distance measurements intermediate said transitions.

8. An interferometric measurement and positioning system for a disk storage system comprising:
a medium adapted for the storage of data;
transducer means for coacting with said data;
actuator means for positioning said transducer relative to said medium;
a semiconductor laser for generating coherent radiation;
collimating means for aligning the radiation generated by said laser;
retroreflector means operable to move in synchronism with said transducer means and reflect at least a portion of said coherent radiation back into said laser;
measurement means associated with said laser for generating an output signal including a sequence of pulses representative of a condition within said laser responsive to said reflected light; and
signal processing means connected to said measurement means for converting said output signal into distance measurements and the direction of relative motion between said semiconductor laser and said retroreflector.

9. An interferometric measurement and positioning system for a disk storage system as in claim 8 wherein said signal processing means includes means for sensing pulses with a greater slope leading edge, indicative of relative motion in one direction and pulses with a greater slope trailing edge, indicative of motion in the direction opposite said one direction.

10. A system according to claim 9 further including; actuator control means, connected to said signal processing means and responsive to said distance measurements, for driving said actuator to position said transducer for coaction with desired data.

11. A system according to claim 10 further including:
means for supplying desired data position information to said signal processing means; and
said signal processing means includes means for determining the distance and direction of movement of said transducer means required for coaction of said transducer means with said data at said desired position.

12. A system according to claim 11 wherein:
said signal processing means includes means responsive to said output signal for maintaining said transducer in position for coaction with data at said desired position.

13. A system according to claim 9 wherein said actuator means comprises a rotary actuator.

14. A system according to claim 9 wherein said actuator means comprises a linear actuator.

15. A system according to claim 9 wheren said actuator means comprises a stepper motor.

16. A system according to claim 9 wherein said retroreflector means is mechanically coupled to said transducer to move in synchronism therewith and provide a change in the length of the path followed by the reflected radiation which approximates twice the distance moved by said transducer.

17. A system according to claim 9 wherein said retroreflector means is mechanically coupled to said transducer.

18. A system according to claim 9 wherein said retroreflector means is mechanically coupled to said transducer to move in synchronism therewith and the path followed by said reflected radiation is coaxial with the movement of said transducer.

19. A system according to claim 9 wherein said retroreflector means is mechanically copled to said transducer to move in synchronism therewith and the path followed by said reflected radiation is at an angle with respect to the movement of said transducer.

20. A system according to claim 19 wherein said angle is 90 degrees.

* * * * *